(12) United States Patent
Muthu-Manivannan et al.

(10) Patent No.: US 8,160,195 B2
(45) Date of Patent: Apr. 17, 2012

(54) PHASE DRIFT COMPENSATION FOR SAMPLED SIGNALS

(75) Inventors: Karthick Muthu-Manivannan, College Station, TX (US); Carl L. Benner, Bryan, TX (US); Peng Xu, College Station, TX (US); Billy Don Russell, College Station, TX (US)

(73) Assignee: The Texas A & M University System, College Station, TX (US)

( * ) Notice: Subject to any disclaimer, the term of this patent is extended or adjusted under 35 U.S.C. 154(b) by 1079 days.

(21) Appl. No.: 11/934,606

(22) Filed: Nov. 2, 2007

(65) Prior Publication Data

US 2009/0116600 A1    May 7, 2009

(51) Int. Cl.
*H04L 7/00* (2006.01)
(52) U.S. Cl. ........ 375/371; 375/226; 375/362; 375/375; 455/119
(58) Field of Classification Search .............. 375/240.29
See application file for complete search history.

(56) References Cited

U.S. PATENT DOCUMENTS

| | | | | |
|---|---|---|---|---|
| 4,308,620 A | * | 12/1981 | Grousseau | 455/75 |
| 5,126,960 A | * | 6/1992 | Thong | 708/276 |
| 5,162,723 A | * | 11/1992 | Marzalek et al. | 324/76.19 |
| 5,572,588 A | * | 11/1996 | Weng et al. | 379/386 |
| 6,038,275 A | * | 3/2000 | Taura et al. | 375/371 |
| 2003/0210645 A1 | * | 11/2003 | Gummadi et al. | 370/203 |

* cited by examiner

*Primary Examiner* — Shuwang Liu
*Assistant Examiner* — Lihong Yu
(74) *Attorney, Agent, or Firm* — Trego, Hines and Ladenheim, PLLC

(57) ABSTRACT

Methods for processing a signal of interest in an electrical power system are provided, as well as systems and computer program products for carrying out the methods. The methods include obtaining a representative window of data points from the signal of interest; obtaining a window of interest containing data points from the signal of interest; and comparing a phase drift compensated window to the representative window, wherein the compensated window is calculated in accordance with the window of interest and a phase drift that is present in the window of interest relative to the representative window.

22 Claims, 12 Drawing Sheets

PHASE DRIFT COMPENSATION FOR SAMPLED SIGNALS

BACKGROUND OF THE INVENTION

The present invention relates generally to a method for analyzing a first signal indicative of a property of an electrical utility power system, and more particularly to a method for compensating for phase drift of the first signal relative to a second signal.

Generally, electrical power originates at a generation station and is transmitted to customers by a system of conductors and other equipment that make up an electrical power system. In a typical prior art power system, an analog signal indicative of a property of electrical power is monitored to determine whether the power system is operating properly. In this regard, the monitored signal is discretely sampled and a plurality of data points are generated that together digitally represent the monitored signal. Data points are grouped together into sets representing a cycle or number of cycles of the periodic property for analysis. Each data point is associated with a particular position during a cycle. The position of a data point within a cycle can be identified in the frequency domain by phase angle.

To monitor the operation of the power system, the set of data points representing the sampled signal is compared to a set of data points that represents a baseline signal. When the sampled signal and the baseline signal are compared, individual data points from corresponding positions during a cycle are compared. If the two data points are from the same position in the cycle, a difference in the magnitude of the data points can be attributed to the operation of the power system. However, if the two data points are not from the same position in their respective cycles, a portion of the difference in magnitude may be attributed to their relative positions in the cycle. In other words, if sampling errors cause a data point to relate to a different position in the cycle than the data point to which it is intended to be compared, then differences in the data points can reflect the sampling errors and not the operation of the power system. Such results can be misleading.

One cause of sampled data points being out of position relative to baseline data points is phase drift. As used herein and discussed below, the term "phase drift" indicates that the digital representations of the two signals differ in phase to some degree.

BRIEF SUMMARY OF THE INVENTION

These and other shortcomings of the prior art are addressed by the present invention, which provides a method for compensating for the phase drift of a sampled signal relative to a representative signal, i.e., baseline.

According to one aspect of the invention, a method is provided for processing a signal of interest in an electrical power system, wherein the signal of interest is subject to phase drift. The method includes: (a) obtaining a representative window of data points from the signal of interest; (b) obtaining a window of interest containing data points from the signal of interest; and (c) comparing a phase drift compensated window to the representative window, wherein the compensated window is calculated in accordance with the window of interest and a phase drift that is present in the window of interest relative to the representative window.

According to another aspect of the invention, a computer program product includes computer-readable media containing instructions causing a computing device to carry out a method for compensating a signal of interest subject to phase drift, wherein the signal of interest is indicative of the operation of an electrical power system. The method includes: (a) obtaining a representative window of data points from the signal of interest; (b) obtaining a window of interest containing data points from the signal of interest; and (c) comparing a phase drift compensated window to the representative window, wherein the compensated window is calculated in accordance with the window of interest and a phase drift that is present in the window of interest relative to the representative window.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
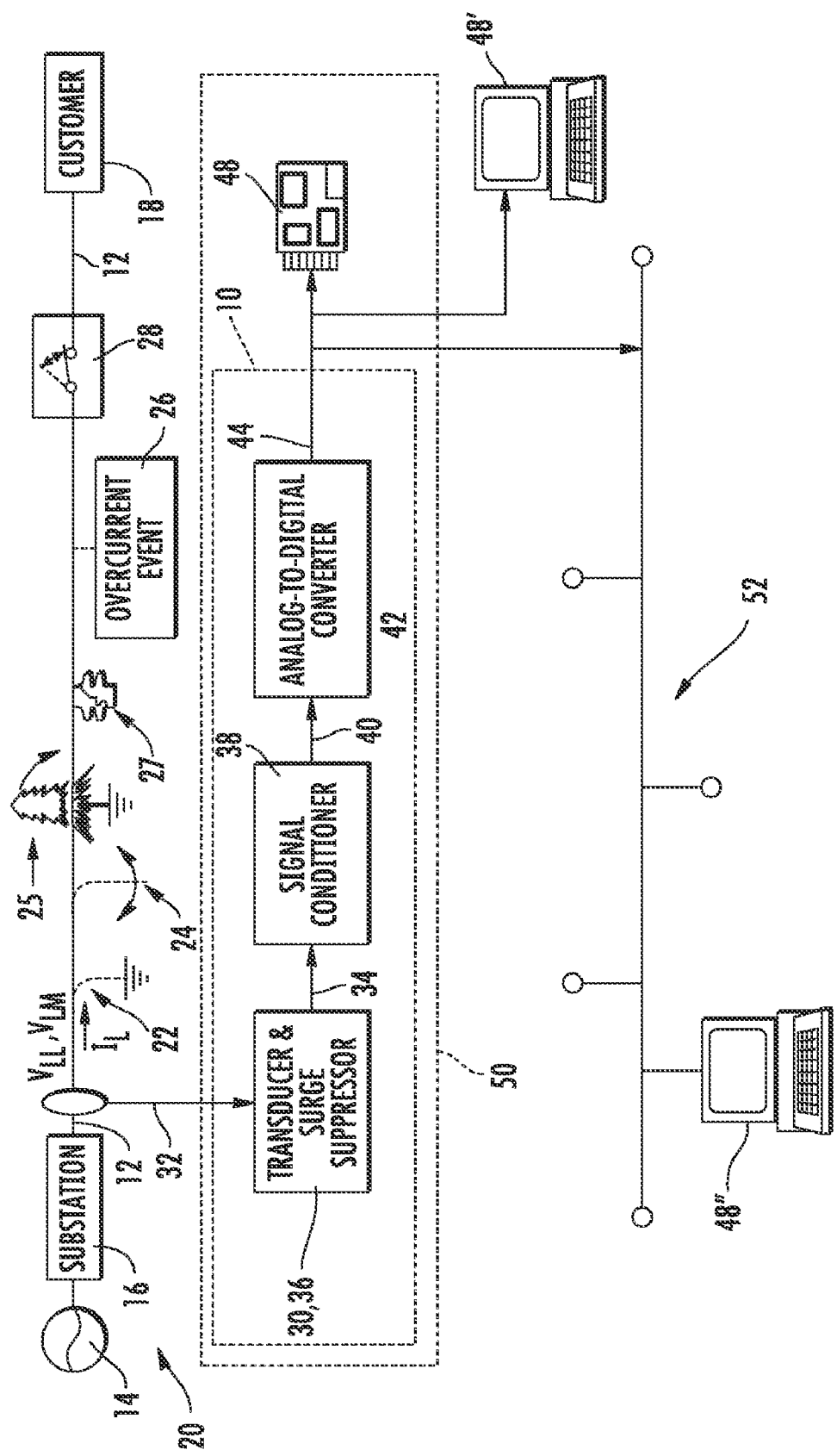
FIG. 1 is a schematic block diagram of a monitoring system for an electric power system constructed according to one aspect of the present invention.

Referring to the drawings, an exemplary phase drift compensation system constructed according to the present invention is illustrated in FIG. 1, coupled to a feeder line 12 of an electrical power system. The feeder line 12 receives power from an AC power source, such as a generating station 14, through a substation 16. Other feeder lines (not shown) may also receive power from the generating station 14 and exit the substation 16. The feeder line 12 delivers power from the substation 16 to a variety of utility customers, such as customer 18.

Altogether, the generating station 14, the substation 16, and the feeder line 12 illustrate a portion of an electrical utility's power system 20. As used herein, the term "line" refers to one or more conductors grouped together for conducting electrical power from a first point to a second point. As used herein, the term "conductor" refers to a material that provides a path for electricity and includes a wire, a group of wires, or other conductive material.

Although the invention is described as implemented in an electrical power distribution system, it will be understood that it may be implemented in any portion of an electric power system, including but not limited to generating stations, substations, transmission lines, primary and secondary distribution lines, and customer facilities.

Most typical power systems generate and distribute power using a three-phase system. Thus, the feeder line 12 may deliver power over three conductors that each conducts a phase A, B, or C. The feeder line 12 may also have a fourth conductor which is referred to as the neutral. For convenience, power system 20 illustrated herein is such a three-phase system that includes a neutral conductor.

The illustrated example includes a data acquisition unit 10, which is shown at a substation 16 in the illustrated embodiment. It is noted that the system and method of the present invention need not include the data acquisition unit 10, but may instead be implemented as software and/or hardware which analyzes data provided from an outside source, such as existing measurement equipment. The present invention may be used at any location within a system of power lines, i.e. generating stations, substations, transmission lines, primary and secondary distribution lines, and customer facilities. Furthermore, multiple data acquisition units 10 can be placed at selected intervals in one or more locations of interest in a power system. For example, data acquisition units 10 could be placed at a substation as well as spread along a line at various distances from a substation such as at 2, 4, 6, and 8 miles from the substation. This "sectionalization" may be useful in determining the specific location of a fault. In this regard, if a fault occurs between miles 4 and 6 from a substation, differences in the signals generated by the data acquisition units 10 positioned at miles 4 and 6 may be useful for determining where the fault occurred relative to miles 4 and 6.

Between the substation 16 and the customer 18, the feeder line 12 may be subjected to a variety of different types of events, conditions, activities, and faults. Some typical events, conditions, activities, and faults are illustrated in FIG. 1, specifically, a downed conductor 22, a dangling conductor 24, contact of vegetation such as a tree 25 or other object with the feeder line 12, and a broken insulator 27. The system may also be subject to other disrupting events, such as an overcurrent event 26 or a switching event performed by a conventional recloser 28 or the like. In addition to conventional faults, the electrical power system is also subject to mis-operation or partial failure of components. For example, devices such as a switching controller for a capacitor bank or a tap changer for a transformer can enter a failure mode in which switching occurs too often. This can cause unacceptable power quality for the customer 18 and wear out the switching equipment, which eventually damages the switching equipment and/or related equipment.

The data acquisition unit 10 includes a monitoring device, such as a sensor or transducer 30, coupled to feeder line 12 as indicated schematically by line 32. The term "monitoring device" is broadly defined herein to include sensing devices, detecting devices, and any other structurally equivalent device or system understood to be interchangeable therewith by those skilled in the art. The illustrated transducer 30 senses or monitors several line parameters, such as line voltages for each phase (line-to-line $V_{LL}$ or line-to-neutral $V_{LN}$), or load current $I_L$ flowing through line 12 for each phase conductor or neutral conductor. Any subset of the 6 voltages or 4 currents measurable in a three-phase system may be monitored. The present invention may also be used with single-phase systems. For instance, in response to monitoring a load current $I_L$ and a line-to-neutral (phase) voltage, transducer 30 produces a parameter signal, here, a signal 34 that is indicative of dual load current and phase voltage. The transducer 30 may be a conventional transducer or an equivalent device, such as a multiple phase current measuring device typically having one current transformer per phase, plus one on the neutral conductor, of the feeder line 12, and a multiple phase voltage measuring device, measuring the line-to-neutral voltages for each phase of line 12. Moreover, the data acquisition unit 10 may receive transducer signals from already existing current and voltage sensors. For example, if only a single phase of the voltage is measured by transducer 30 or another transducer (not shown), the data acquisition unit 10 may be equipped with conventional hardware or software of a known type to derive the other two phases. That is, knowing one phase voltage on a three-phase system, the other two phases may be obtained by applying the appropriate plus/minus appropriate (e.g., 120°) phase shift to the monitored phase voltage. It is also conceivable that other parameters, e.g. power factor, of the power flowing through line 12 may be measured with suitable transducers.

The data acquisition unit 10 may also include surge protection, for example, a surge suppressor or protector 36. The surge protector 36 may be supplied either with the transducer 30, as illustrated, or as a separate component. The surge protector 36 protects the data acquisition unit 10 from power surges on the feeder line 12, such as those caused by lightning strikes or the like.

The data acquisition unit 10 may include a signal conditioner 38 for filtering and amplifying the signal 34 to provide a clean, conditioned signal 40. Preferably, the signal conditioner 38 includes one or more filters (e.g. low-pass, band-pass, high-pass, notch) for removing frequency components not of interest for the analysis such as signal noise. The data acquisition unit 10 may be used with a single frequency in the spectrum, or a combination of frequencies.

The signal conditioner 38 may also amplify the parameter signals 34 for the appropriate range required by an analog-to-digital (A/D) converter 42. For example, the current flowing on the power system 20 may have a dynamic range of 10 to 10,000 Amps, which transducer 30 may convert into a time-varying voltage signal of, for example, ±25 volts, whereas the A/D converter 42 may accept voltages of ±10 volts. In this case the signal conditioner 38 appropriately converts and scales these signals for conversion by the A/D converter 42 from an analog signal 40 into a digital parameter signal 44.

When the transducer 30 is an analog device, the data acquisition unit 10 includes the illustrated discrete A/D converter 42. The transducer 30 may also be implemented as a digital device which incorporates the signal conditioning function of conditioner 38 and the analog-to-digital conversion function of the A/D converter 42.

The digital parameter signal 44 is supplied to a computing device for analysis. An example of a suitable computing device includes a conventional microcomputer (sometimes referred to as a personal computer or "PC"). However, any device capable of executing a program instruction set to analyze the digital parameter signal may be used. As shown in FIG. 1, a computing device 48 such as a "single board computer" is directly connected to the data acquisition unit 10 and may be placed inside a common housing or container with the data acquisition unit 10, or otherwise integrated with the data acquisition unit 10, to form a self-contained detection and analysis unit 50. Alternatively or in addition to the computing unit 48, an external computing unit 48' may be connected to the data acquisition unit 10 using a direct connection such as a serial or parallel cable, wireless link, or the like. Furthermore, the data acquisition unit 10 may be connected to a remote computing unit 48" through a network 52 e.g., a local area network (LAN), a wide area network (WAN), or the Internet. Also, it is noted that the analysis method described herein may be integrated into existing systems which already include data collection and/or processing capability. For example, known types of relays, power quality meters, and other equipment used in power transmission or distribution often contain microprocessor-based electronics suitable for performing the analysis.

General Operation

Various aspects of the present invention can be better understood in light of the general operation of a data acquisition unit 10 and the problems of phase drift that can be associated with data acquisition. In one embodiment, the data acquisition unit 10 is configured to sample data points at a nominal predetermined rate from an analog signal of interest that is indicative of an electrical property of a conductor of feeder line 12. As used herein, the term "signal of interest" refers to the analog signal being monitored. In the illustrated example the signal of interest is indicative of current, the predetermined sample rate is nominally 256 samples per cycle, and the generating station 14 generates alternating current (AC) electrical power at a nominal frequency of 60 Hz, i.e., 60 cycles per second.

It should be appreciated that due to such causes as imperfections in the circuitry of the data acquisition unit 10 or variations in the generating station 14, the actual sample rate may be different from the desired sample rate of 256 samples per cycle. As indicated above, this difference causes phase drift.

Phase drift may be introduced inadvertently in one or more frequency components of a sampled signal by inconsistent sampling rate, changes in the fundamental frequency of the signal being sampled, and other causes known to those skilled in the art. For example, consider a sampling system that is designed to sample a signal from a power system that is operating at a nominal frequency of 60.0 Hertz at a rate of 15,360 evenly spaced samples per second. The frequency and sample rate combine to yield precisely 15,360/60=256 samples per cycle. This is the desired, i.e., ideal operation of the sampling system. Now consider the following two examples of non-ideal situations that commonly occur in sampling systems.

In one hypothetical case, imprecise tolerances in a sampling system's circuitry cause the sampling system to acquire samples at a rate of 15,437 samples per second. If the power system operates exactly at its nominal frequency of 60 Hertz, the system would acquire 15,437/60=257.3 samples per cycle, instead of the desired 256 samples per cycle.

In a second hypothetical case, the power system's frequency varies slightly over time from its nominal value of 60 Hertz. Suppose that at a particular point in time the power system actually is operating at 59.7 Hertz and that the sampling system continues to digitize the signal at a rate of 15,360 samples per second. Therefore, the sampling system will acquire 15,360/59.7=257.3 samples per cycle, instead of the desired 256 samples per cycle.

Either of the situations described above can cause the number of samples per cycle to be other than the desired 256 samples per cycle. In practice, both the sampling rate and the power system frequency often differ from their nominal values at the same time, producing either compounding errors or offsetting errors in sampling rate. For example, consider a sampling system that acquires 15,437 samples per second from a power system operating at 59.7 Hertz. In this example, the inaccuracies in sampling rate and power system frequency compound and result in the acquisition of 15,437/59.7=258.6 samples per cycle, instead of the desired 256 samples per cycle. Conversely, if a sampling system acquires 15,437 samples per second from a power system operating at 60.3 Hertz, the inaccuracies are offsetting and result in the acquisition of 256 samples per cycle.

There are other causes of inaccurate sample rates that can be offsetting or compounding, but the source of the inaccuracies is irrelevant to the present invention. Herein, inaccuracies in sample rates are referred to as "phase drift" because that is how these inaccuracies manifest themselves in digital signal processing routines.

Figure 2:
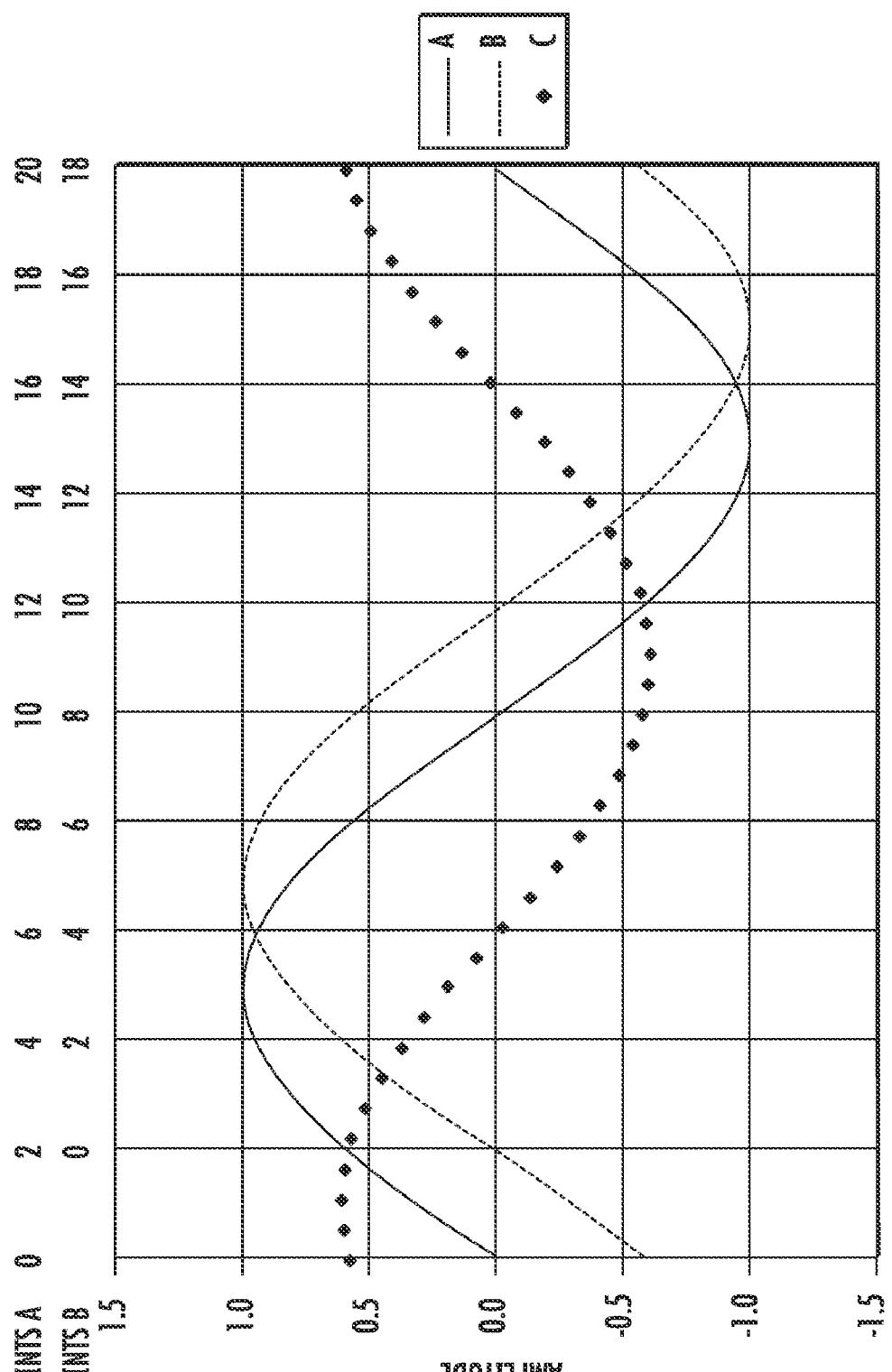
FIG. 2 is a chart showing two identical, signals which differ in phase.

As a result of phase drift, comparisons of data points may yield misleading results because the actual sample rate per cycle differs from the desired sample rate per cycle. For example FIG. 2 shows two signals, A and B, that are identical except that one is shifted in time with respect to the other. Each signal is sampled at regular intervals and at the same position along the cycle. In this regard, signals A and B are sampled at the beginning of the cycle at point 0 and at the end of the cycle at point 20. If there is no time shift between the two signals, i.e., if the signals are in phase with one another, the difference between signals A and B is zero at every point. However, as stored in data acquisition unit 10, there is a time delay between the two signals, i.e., the two signals differ in phase. Although signals A and B are identical in shape, if the two signals are directly compared as acquired by data acquisition unit 10, differences in magnitude will appear to be present as can be seen on comparison chart C of FIG. 2. The apparent differences in magnitude shown in chart C of FIG. 2 are due to inadvertent apparent time shifts, or phase drift, that are introduced by the data acquisition unit 10 and not due to true differences in the signals.

As shown in FIG. 2, the phase drift present between signal A and signal B is equal to 2 samples. In order to correct for the phase drift, the stored signals can be effectively shifted so that data point 0 of signal B is compared to data point 0 of signal A; data point 1 of signal B is compared to data point 1 of signal A; and so on. The present invention provides methods for correcting for phase drift prior to signal analysis by first estimating phase drift and then compensating for the phase drift by mathematically modifying the values of the data points sampled by the data acquisition unit 10. In this manner, the modified, i.e., compensated, data sampled by data acquisition unit 10 can be used in a subsequent analysis that relies on known sample rates per cycle at known phases within the cycle. It should be appreciated that the present invention is capable of compensating phase drifts that cause an apparent shift of a fractional number of samples, not just an integer number of samples.

As discussed below, computing unit 48 is configured to mathematically manipulate the data points sampled by data acquisition 10 and compensate for phase drift such that a window of interest, i.e., a set of data points from the signal of interest, can be compared to a representative window of data points from the signal of interest without introducing the effects of inadvertent phase drift. As used herein, the term "representative window" refers to a set of data indicative of the signal of interest during a predetermined period of time. The predetermined period of time represented by the representative window may occur before the window of interest.

Figure 3:
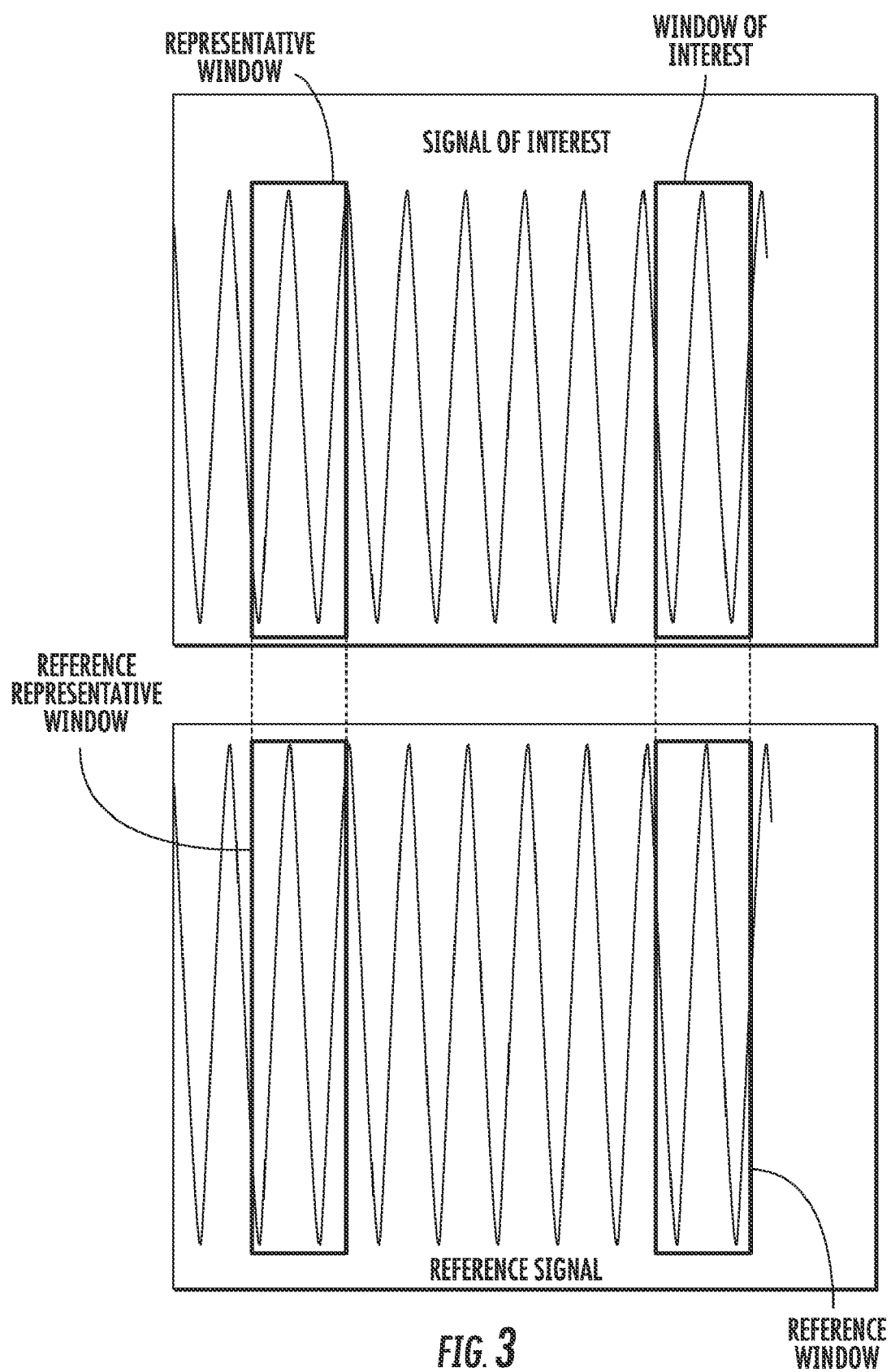
FIG. 3 is a plot of exemplary signals with windows superimposed thereon.

As used herein, the term "reference signal" refers to a signal that is sampled synchronously with the signal of interest. The reference signal can represent the same property as the signal of interest or the reference signal can represent a different property than the signal of interest. A reference window is sampled from the reference signal synchronously with the window of interest and a reference representative window is sampled synchronously with the representative window. The reference window can be equal to, i.e., include the same data points, as the window of interest or the reference window can be different than the window of interest. In a similar manner, the reference representative window can have the same number of points as the representative window. Alternatively, the reference window can contain data that is indicative of a signal other than the signal of interest. Preferably, a reference signal is chosen such that the data therein is less "noisy," i.e., has less variation relative to the base signal. Also, preferably the representative window is chosen such that the data therein is less "noisy" than data within the window of interest. FIG. 3 shows an example signal of interest with the corresponding representative window and window of interest, and a reference signal with its corresponding reference representative window and reference window.

Symbols

The following symbols are used to represent the signals and operations performed thereon in particular embodiments of the methods disclosed herein. Other symbols used will be defined immediately following their first use.

x(n): The sampled signal of interest that needs to be compensated for phase drifts.

$w(n)=x(n+l)$, $n=0, \ldots, L-1$: A window of L samples taken from the signal of interest x(n) starting at sample l.

$x^{(ref)}(n)$: The sampled reference signal that is to be used for estimating phase drifts observed in x(n) As stated above, $x^{(ref)}(n)$ may be the same as x(n) or any other signal that has been sampled synchronously along with x(n).

$w^{(ref)}(n)=x^{(ref)}(n+l)$, $n=0, \ldots, L^{(ref)}-1$: A window of $L^{(ref)}$ samples taken from the reference signal $x^{(ref)}(n)$ starting at sample l.

F: The sampling frequency.

f: The frequency component selected for estimating phase drifts. f is selected such that there exists a non zero integer k for which f can be represented in the form $f=k\times F/N$. Where N is an integer representing the number of samples that will be used in calculating the phase angle of the frequency component f.

Phase Compensation

The present invention provides a method for compensating for phase drift in signals indicative of the operation of an electrical power distribution system and can be better understood in view of the illustrated embodiment. In the illustrated embodiment, the data acquisition system 10 is utilized to collect, store, and modify data points that are indicative of a property of the feeder line 12. For this example, the signal of interest is current, and the reference signal is voltage. First, the data acquisition system 10 obtains a window of interest that includes data points collected during a predetermined period of time and associated with a first phase angle. A representative window of data points is retrieved from storage or taken from data acquisition 10. The representative window includes data points indicative of current, i.e., the signal of interest, taken at a different time than the window of interest. The representative window is associated with a second phase angle.

If the first phase angle, associated with the window of interest, is different than the second phase angle, associated with the representative window, then phase drift is present. The phase drift can be referred to as an angle $\Delta\theta(f)$, if determined in a frequency domain, or as a value "s" if determined in the time domain. The value s includes an integer portion and a fractional portion, either of which may be equal to zero.

After the phase drift is calculated, the window of interest is used along with the phase drift to determine a compensated window. As used herein, the term "compensated window" refers to a window of data points that contains data from which the inadvertent phase changes have been removed. Because the compensated window is based on the window of interest and is in phase with the representative window, the compensated window can be used to compare the window of interest to the representative window.

In this manner, the operation of the electrical power system, and the feeder line 12 in particular, can be compared at the time when the representative window was taken. It is believed that differences in the compensated signal and of the representative signal are indicative of changes in the operation of feeder line 12. These changes could be associated with problems such as those typical faults illustrated in FIG. 1, specifically, an arcing fault caused by a downed conductor 22, a dangling conductor 24, contact of vegetation such as a tree 25 or other object with the feeder line 12, or a broken insulator 27.

Estimating the Phase Drift

Two exemplary methods are provided for computing the phase drift $\Delta\theta(f)$ observed in the window of interest w(n) with respect to representative window $w_o(n)$ at a frequency component f. It is assumed that the inadvertent phase drifts introduced in the signal x(n) can also be observed on a synchronously sampled reference signal $x^{(ref)}(n)$. It is also assumed that angular differences introduced between windows $w^{(ref)}(n)$ and $w_o^{(ref)}(n)$ due to inadvertent phase drifts of the reference signal will be the same as the angular differences introduced between the w(n) and $w_o(n)$ Now windows $w^{(ref)}(n)$ and $w_o^{(ref)}(n)$ of the reference signal corresponding to windows w(n) and $w_o(n)$ of the signal of interest can be used for estimating the phase drift $\Delta\theta(f)$. $\Delta\theta(f)$ can be computed as follows:

$$\Delta\theta(f) = \theta^{(ref)}(f) - \theta_o^{(ref)}(f) \quad (1)$$

Where:

$\theta^{(ref)}(f)$ is the estimated phase angle of the frequency component computed for window $w^{(ref)}(n)$.

$\theta_o^{(ref)}(f)$ is the estimated phase angle of the frequency component computed for the window $w_o^{(ref)}(n)$.

$$n = 0, 1, 2 \ldots N-1$$

Since f is of the form $f=k\times F/N$ where $k=0, 1, \ldots, N-1$, $Y(f) \equiv Y(k)$. Where Y(k) is the frequency component of f for any window y(n), $n=0, 1, \ldots, N-1$ can be computed based on single point DFT as follows $$Y(k) = \sum_{n=0}^{N-1} y(n)e^{-j2\pi kn/N}, k = 0, 1, \ldots, N-1 \quad (2)$$

Without any loss of generality, Y(k) can be represented in the form $$Y(k) = M(k)e^{j\theta(k)} \quad (3)$$

Based on equations (2) and (3), $\theta^{(ref)}(f)$ and $\theta_o^{(ref)}(f)$ can be computed as follows:

$$\theta^{(ref)}(f) = \text{Angle}(W^{(ref)}(k))N/k \quad (4)$$

$$\theta_o^{(ref)}(f) = \text{Angle}(W_o^{(ref)}(k))N/k \quad (5)$$

Where $W^{(ref)}(k)$ and $W_o^{(ref)}(f)$ are calculated from $w^{(ref)}(n)$ and $w_o^{(ref)}(n)$ respectively using equation (2).

$\Delta\theta^{(ref)}(f)$ can now be computed based on equations (1), (4) and (5).

In one example, sampled voltage waveforms corresponding to phase A, B or C measured at a power distribution substation were used as reference signal $x^{(ref)}(n)$. The following parameter values were also used:
F=15360 samples/second
N=256 samples
f=60 Hz
k=1

Compensating for the Estimated Phase Drift in a First Method

One embodiment of the present invention provides a first, discrete-Fourier-transform (DFT) based method that compensates for the phase drift observed in various frequency components of the window of interest w(n) with respect to a representative window $w_o(n)$. It is assumed that the phase drift between these two windows for frequency f, denoted as $\Delta\theta(f)$, is already calculated either using the single frequency DFT based phase drift estimation method that was outlined in the previous section or using any other suitable method known to one skilled in the art.

The DFT based compensation includes at least the following three steps:
(1) Forward DFT computation;
(2) Phase correction in frequency domain; and
(3) Inverse DFT computation for determining a phase drift compensated window.

The forward DFT computation for the window w(n) results in the computation of the phase and magnitudes of the various frequency components as follows:

$$W(k) = \sum_{n=0}^{L-1} x(n+l)e^{-j2\pi kn/L}, k = 0, 1, \ldots, L-1 \quad (6)$$

Phase correction in frequency domain is done as follows:

$$\hat{W}(k) = W(k)e^{-j\Delta\theta(f)k/L}, k=0, \ldots, L-1 \quad (7)$$

The phase drift compensated window ŵ(n) can now be computed by performing an inverse DFT on the phase corrected frequency components Ŵ(k) computed in (7), as follows:

$$\hat{w}(n) = \sum_{k=0}^{L-1} \hat{W}(k)e^{j2\pi kn/L}, n = 0, 1, \ldots, L-1 \quad (8)$$

Though equations (6) and (8) use DFT for the conversion from time domain to frequency domain and IDFT for the conversion from frequency domain to time domain, a person skilled in the art may easily substitute these operations by more efficient implementations of the DFT and IDFT such as FFT (Fast Fourier Transform) and IFFT (Inverse Fast Fourier Transforms) or their variations.

In one example, sampled voltage waveforms corresponding to phase A, B, or C measured at a power distribution substation were used as reference signal $x^{(ref)}(n)$. Phase drift compensation was done on each sampled current (phase A, B, C and Neutral) waveform and on each sampled voltage (phase A, B and C) waveform measured at the substation. Goertzel's algorithm was used for the computation of $\Delta\theta(f)$; FFT and IFFT were used to do the forward DFT and inverse DFT computations respectively.

The following parameter values were also used:
F=15360 samples/second
N=256 samples
f=60 Hz
k=1

Compensating for Phase Drift in a Second Method

A second, interpolation-based method may be used to compensate for the phase drift observed in various frequency components of the window of interest w(n) with respect to a representative window $w_o(n)$. As with the first method discussed above, it is assumed that the phase drift between these two windows for frequency f, denoted as $\Delta\theta(f)$, is already calculated either using the single frequency DFT based phase drift estimation method that was outlined in the previous section or using any other suitable method. In one embodiment of the second method, the phase drift is expressed as "s" which includes an integer component and a fractional component, either of which may be equal to zero. A phase drift compensated window ŵ(n) is obtained by shifting the window of interest w(n) by the integer component of s to derive an integer shifted window, and then correcting for the fractional phase drift, i.e., the fractional component of s, by interpolation based on the integer shifted window w'(n). The interpolation is achieved by processing the shifted window with a filter configured to shift the integer shifted window w'(n) by a predetermined amount based upon a predetermined fraction. The filter may be a digital filter and the predetermined fraction may be chosen to approximate the fractional component of s. The filter can be chosen from a plurality of filters that are each based upon a different predetermined fraction.

The interpolation based compensation method includes at least the following steps:

Step-1: Representing $\Delta\theta(f)$ in the form $$-\Delta\theta(f) = 2\pi s_f + \epsilon_f F/f \quad (9)$$

where:
$s_f$—represents the number of samples that need to be shifted to achieve the phase drift compensation
$\epsilon_f$—is the fractional phase drift compensation that is to be achieved for the frequency f using a digital filter.
This is in addition to the phase drift achieved by shifting the samples in window w(n) by s.
with the constraint $$|\epsilon_f| < \phi_f$$

where $$\phi_f = 2\pi f/F$$

$\phi_f$—is the phase expected phase difference in the frequency component f between two successive samples obtained from the window of interest.

F—is the sampling rate.

Step-2: A window w'(n)=w(n+s) is obtained by shifting the samples in the window w(n) by s samples.

Step-3: The phase drift compensated window ŵ(n) is then obtained by filtering w'(n) obtained in the above step using a digital filter H, which should be selected such that it provides phase drift $\phi_f$ for the frequency component f that obeys the following constraint:

$$|\phi_f - \epsilon_f| \leq \tau, \quad (10)$$

where $\tau$ is a small tolerance value.

In one embodiment, the following procedure was used in designing the digital filter H used in step 3 of the method described above:

An up-sampling rate I was selected, where I is the smallest integer that satisfies the following condition:

$$\phi_f / I \leq \tau. \quad (11)$$

A FIR (Finite Impulse Response) low-pass filter P with cut-off frequency of F/(2I) was used. Let p(m), m=0, 1, ..., M−1 be the unit impulse response of P.

I Poly-phase interpolation filters H' can obtained from P as follows:

$$h'(n,i) = p(i+nI) \; i=0,1,\ldots,I-1$$

$$n=0,1,\ldots,L-1,$$

where L=M/I is an integer and h'(n,i) is the unit impulse response of H'(i). Each such derived filter H'(i) will provide a phase drift of $i\phi_f/I$.

When i in H'(i) is selected such that it obeys the following condition $$|i\phi_f/I - \epsilon_f| <= \tau, \quad (12)$$

where $\tau$ is a small tolerance value used in equation (10) in step 3.

H used in step 3 can now be substituted by H'(i).

Alternatively, the order in which steps 2 and 3 are performed can be reversed, i.e., the fractional phase drift can first be accomplished by using the filter H and then the fractional phase drift compensated window can be shifted by a integer number of samples to obtain the final phase drift compensated window. In one embodiment, sampled voltage waveforms corresponding to either phase A, B or C measured at a power substation were used as reference signal x(n). Phase drift compensation was done on each sampled current (phase A, B, C and Neutral) waveform and each sampled voltage (phase A, B and C) waveform measured at the substation. Goertzel's algorithm was used for the computation of $\Delta\theta(f)$.

The following parameter values were also used:
F=15360 samples/second
N=256 samples
f=60 Hz
k=1
I=15
τ=0.1 degree Phase Drift Tolerant Comparison Method for Sampled Signals This section describes a method to accurately compare segments of samples from a sampled signal in the presence of phase drifts. The sampled signal may contain phase drifts that were introduced inadvertently in one or more frequency components of a sampled signal(s). Such phase drifts may be introduced by, but are not limited to, inconsistent sampling rate, changes in the fundamental frequency of the signal(s) being sampled.

Simple comparison involves comparing sample(s) from one section of a sampled signal with samples(s) from another section of the same sampled signal. The comparison operation may involve finding the difference between the samples being compared but is not limited to such differencing. In the presence of inadvertent phase drifts, the simple comparison may yield erroneous results. The following examples will illustrate this problem.

EXAMPLE 1

Figure 4:
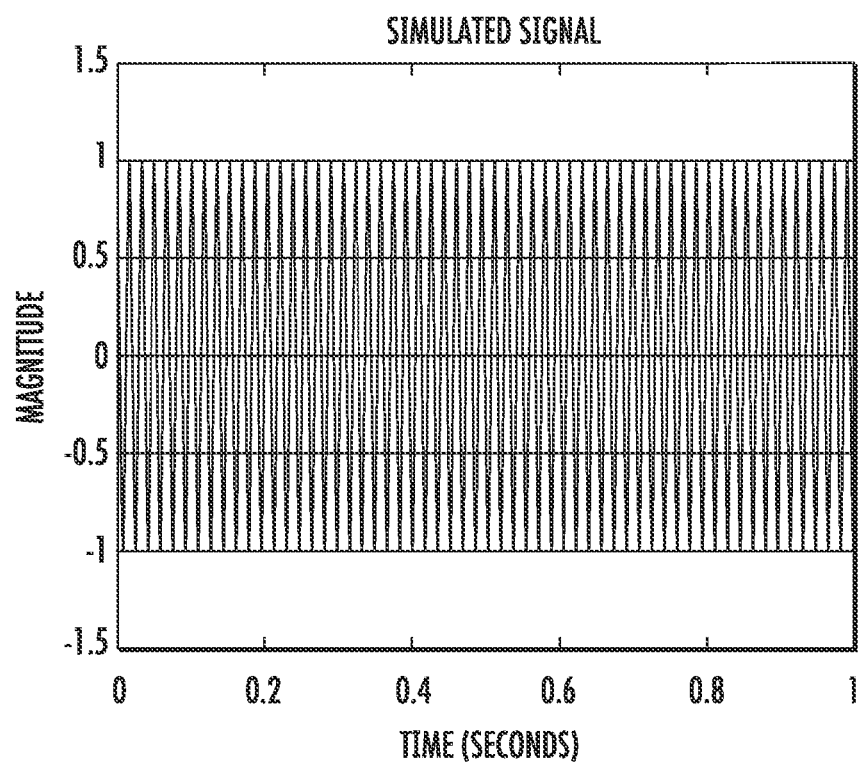
FIG. 4 is a plot showing a simulated sinusoidal signal with a frequency of 60 Hz and unit magnitude.
Figure 5:
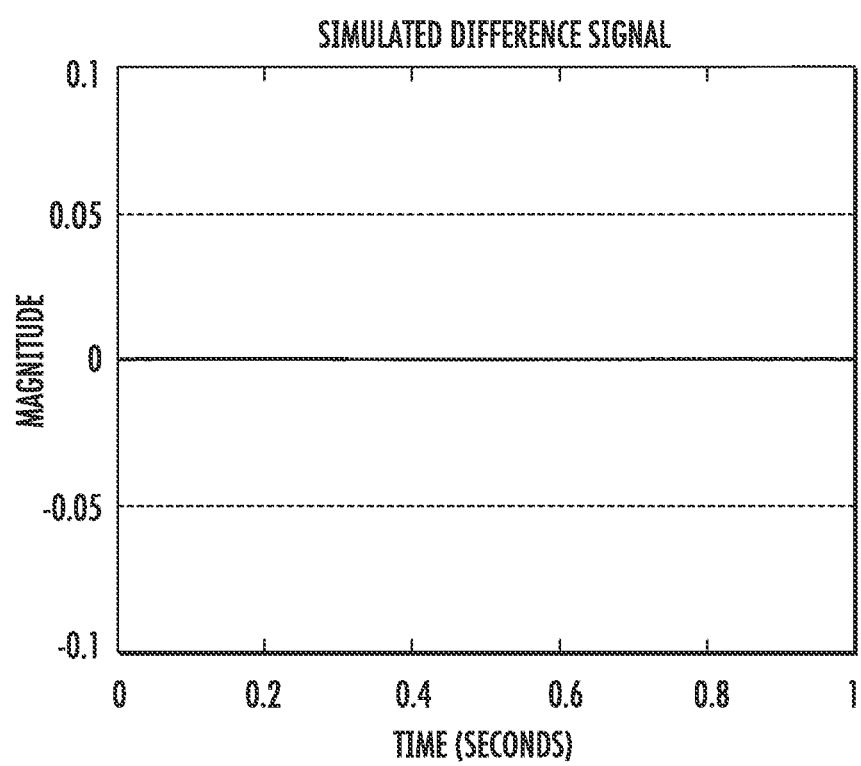
FIG. 5 shows a simulated differenced signal.

FIG. 4 shows a plot of a simulated sinusoidal signal with a frequency of 60 Hz and unit magnitude, sampled at a rate of 15360 samples/second for one second. The simple comparison is done by first breaking the simulated signal into 60 non overlapping windows, each of which has 256 samples corresponding to one cycle; then, subtracting the first window, which serves as a representative window, from each of the following windows in a point-by-point fashion. FIG. 5 shows that the result is zero. This is because there is no change observed in the simulated signal over the period of one second.

Figure 6:
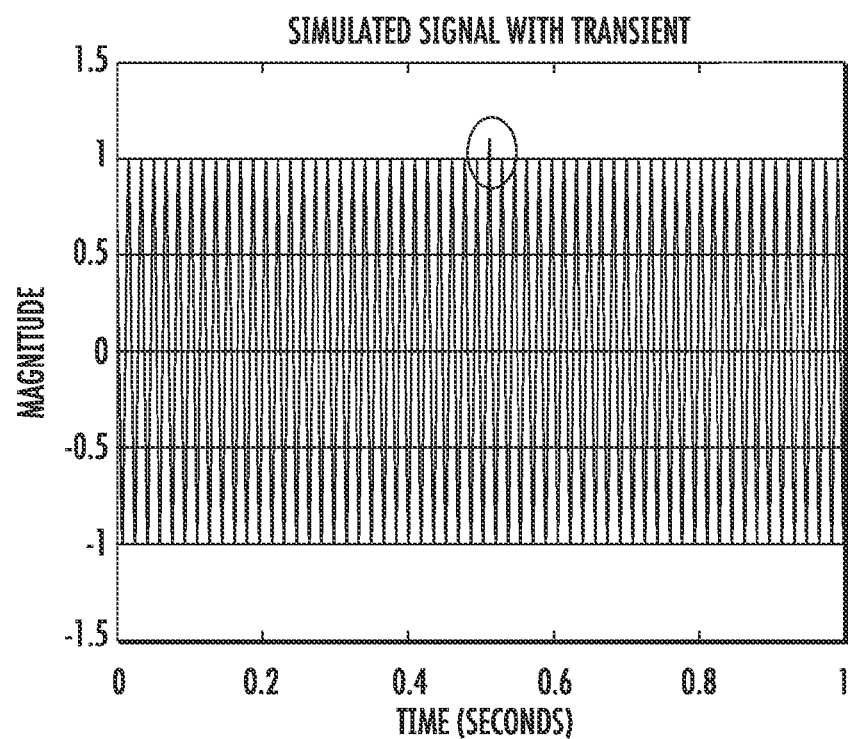
FIG. 6 is a plot showing the simulated sinusoidal signal of FIG. 4 wherein a transient is introduced at 0.5 seconds.
Figure 7:
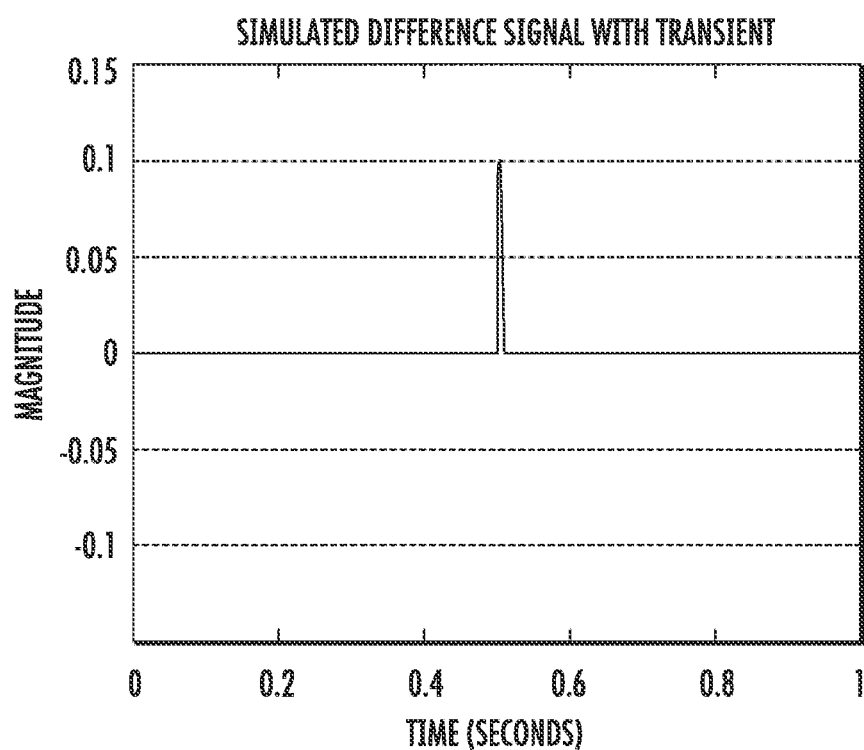
FIG. 7 shows a simulated differenced signal based on the signals shown in FIGS. 4 and 6.

FIG. 6 shows a plot of a simulated sinusoidal signal with a frequency of 60 Hz and unit magnitude, sampled at a rate of 15360 samples/second, for one second. A small transient magnitude was introduced at time=0.5 seconds. FIG. 7 clearly shows this transient. It should be understood that, even though this and the following examples show how the invention can be used to detect small transients, the same technique can be used to detect sustained changes too. Comparing FIG. 6 and FIG. 7, it is obvious that the simple comparison technique provides an effective means to detect small transients. It also allows the easy detection of transients buried in a signal since it removes the steady state component of the sampled signal.

The simple comparison shown in above example does not work well when phase drifts are introduced in the sampled signal. One such scenario is demonstrated in the next example.

EXAMPLE 2

Figure 8:
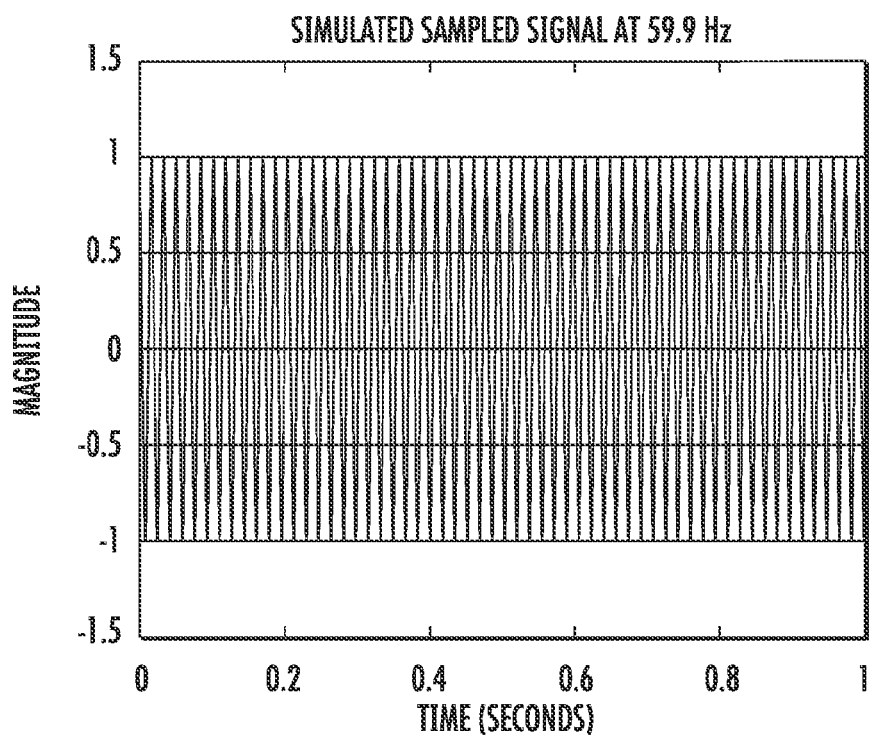
FIG. 8 shows a plot showing a simulated sinusoidal signal with a frequency of 59.9 Hz and unit magnitude.
Figure 9:
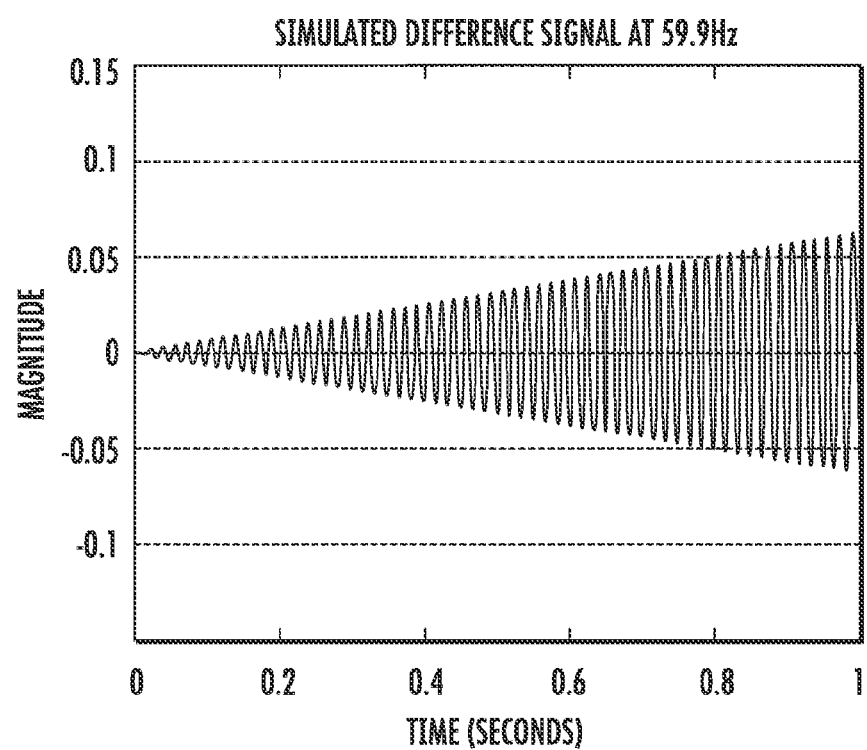
FIG. 9 shows a simulated differenced signal based on the signals of FIGS. 4 and 8.

FIG. 8 shows a plot of a simulated sinusoidal signal with a frequency of 59.9 Hz and unit magnitude, sampled at a rate of 15360 samples/second for one second. This simulated waveform is an example of the actual fundamental frequency of the power system being 59.9 Hz instead of the nominal 60 Hz that was expected. Such inexactitudes in fundamental frequency will introduce apparent, inadvertent phase drifts in the sampled signal when its sampling rate assumes an exact system frequency of 60 Hz. FIG. 9 shows the result of a simple comparison. The simple comparison was done by first breaking the simulated signal into 60 non overlapping windows of 256 samples each. Then the first window of 256 samples was used as a representative window and the values in this window were subtracted from corresponding 256 values of each of the 60 windows in a point-by-point fashion. Unlike in FIG. 5 of Example 1, we see that the result of the comparison yields a signal whose magnitude seems to be ramping up, even though there was no real change in the magnitude of the sampled signal. This apparent change is not a real change in the shape of signal, but rather a spurious effect, or artifact, of the phase drift that was introduced because the fundamental frequency of the sampled signal was 59.9 Hz instead of the expected value of 60 Hz.

Figure 10:
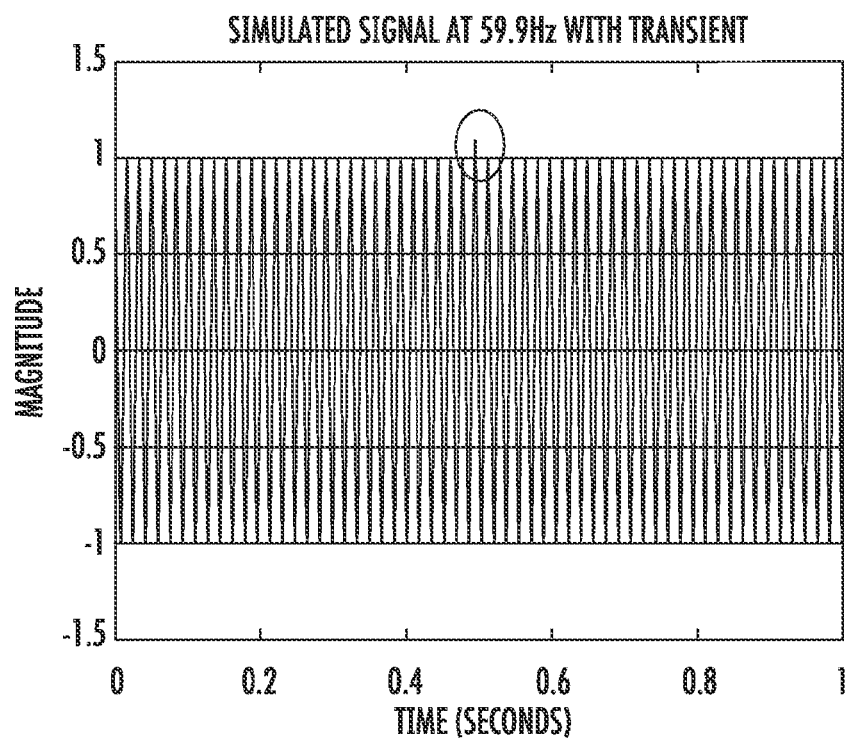
FIG. 10 shows a plot showing the simulated sinusoidal signal of FIG. 8 wherein a transient is introduced at 0.5 seconds.
Figure 11:
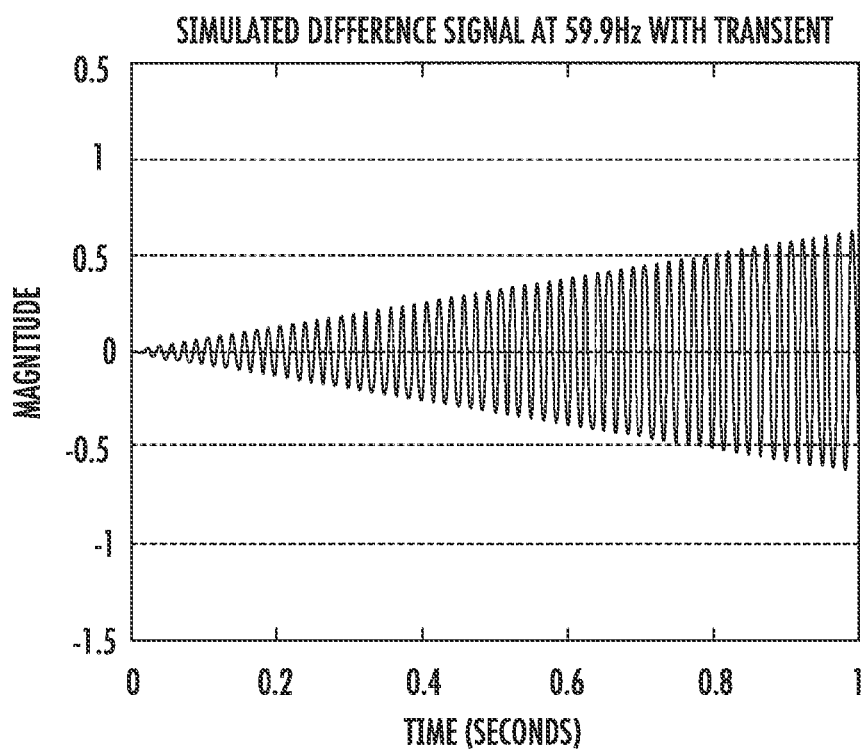
FIG. 11 shows a simulated difference signal with transient based on the signals shown in FIGS. 4 and 10.

FIG. 10 shows a plot of a simulated sinusoidal signal with a frequency of 59.9 Hz and unit magnitude, sampled at a rate of 15360 samples/second, for one second but a small transient was introduced at time=0.5 seconds. FIG. 11 shows the result of a simple comparison done using the method described in the previous paragraph. This time, unlike in FIG. 7 of Example 1, the transient that was introduced at time=0.5 seconds is no longer seen distinctly. Thus this example shows how inadvertent phase drifts introduced in the sampled signal can reduce the effectiveness of the simple comparison method. Though only the effect of phase drift introduced by an inexactitude in the fundamental frequency of the sampled signal was shown in this example, similar analysis also applies to phase drifts introduced by, but not limited to inaccurate sampling rate.

Referring now specifically to the phase drift tolerant comparison method, it is for comparing samples from the window of interest w(n), obtained from the sampled signal of interest x(n), to a representative window $w_o(n)$, also obtained from x(n), while minimizing the effect of inadvertent phase drifts that may have been introduced in the sampled signal.

According to the phase drift tolerant comparison method for sampled signals a phase drift compensated window ŵ(n) is determined. The phase drift compensated window ŵ(n) can be determined according to the methods described above or according to other methods known to those skilled in the art. A comparison window Δw(n) is computed where Δw(n)=ŵ(n)⊕$w_o$(n). The symbol ⊕ represents an operation done using the phase drift compensated window ŵ(n) and the representative window $w_o$(n).

In one embodiment that is currently implemented by the inventors, the computation of a phase drift compensated window ŵ(n) was done using the first method described above using DFTs and the operator ⊕ was replaced by simple subtraction. The next two examples demonstrate the effectiveness of said embodiment.

EXAMPLE 3

A simulated sinusoidal signal with a frequency of 59.9 Hz, same as in FIG. 8, was used as the signal of interest. Similar to Example 2, the first window of 256 samples was used as a representative window. Then the phase drift tolerant comparison was done by first breaking the simulated signal into 60 non overlapping windows of 256 samples each. Each of these windows was compensated for phase drifts using the first, DFT, method and the parameters:

F=15360 samples/second
N=256 samples
f=60 Hz
k=1

Figure 12:
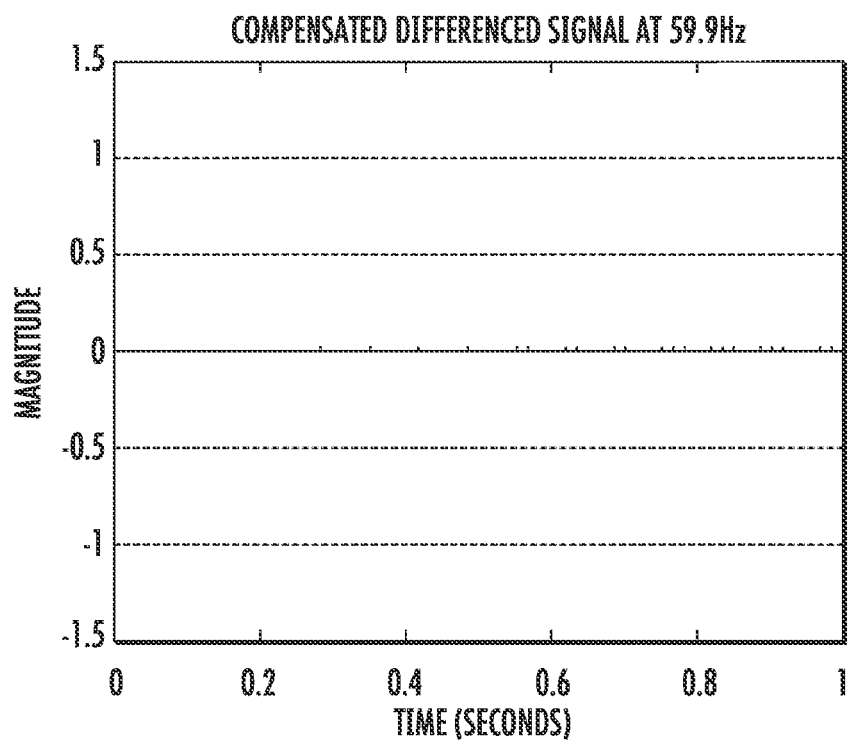
FIG. 12 shows a simulated compensated differenced signal based on the signal shown in FIG. 4 and a phase corrected signal derived from the signal shown in FIG. 8.
Figure 13:
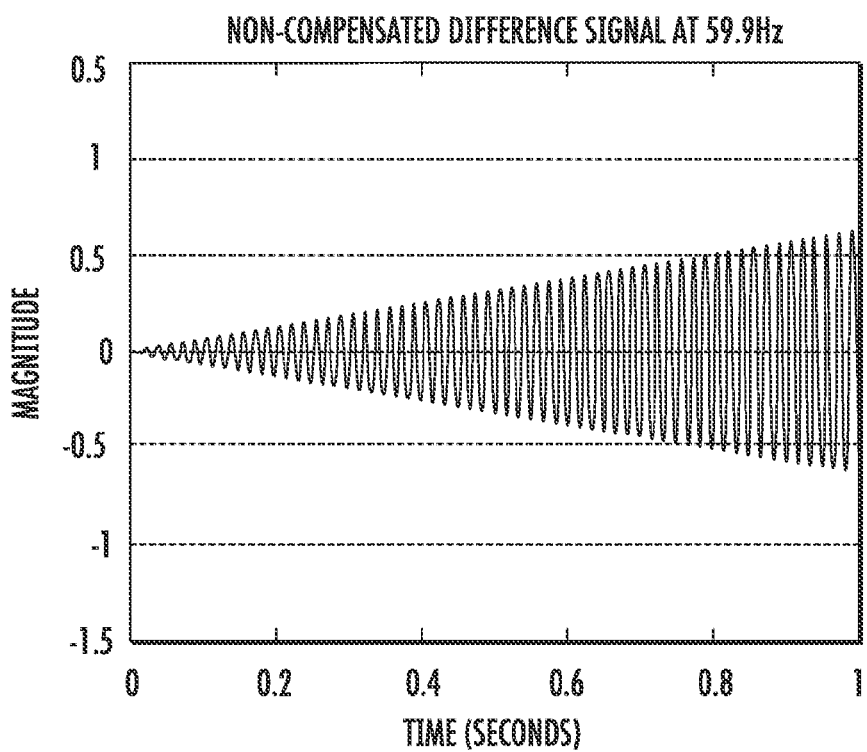
FIG. 13 shows a simulated difference signal with transient based on the signals shown in FIGS. 4 and 8.

Then the values in the representative window were subtracted from corresponding 256 values of each of the 60 windows in a point-by-point fashion. FIG. 12 shows the result of this phase drift compensated difference operation and FIG. 13 shows the result of the comparison operation without employing the phases drift compensation.

Figure 14:
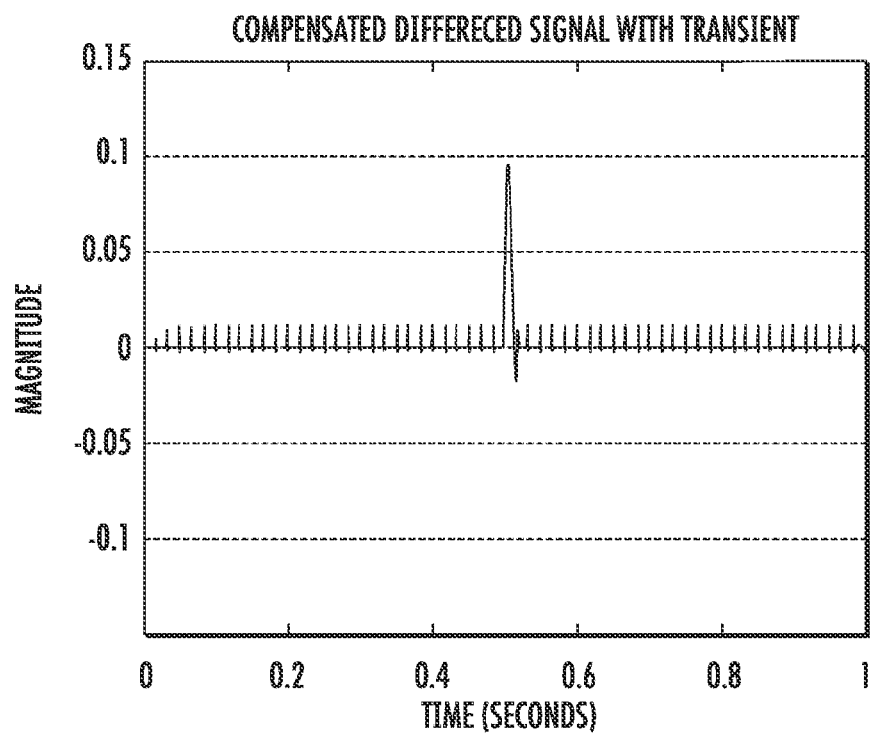
FIG. 14 shows a simulated compensated differenced signal with transient based on the signals shown in FIGS. 4 and 10.
Figure 15:
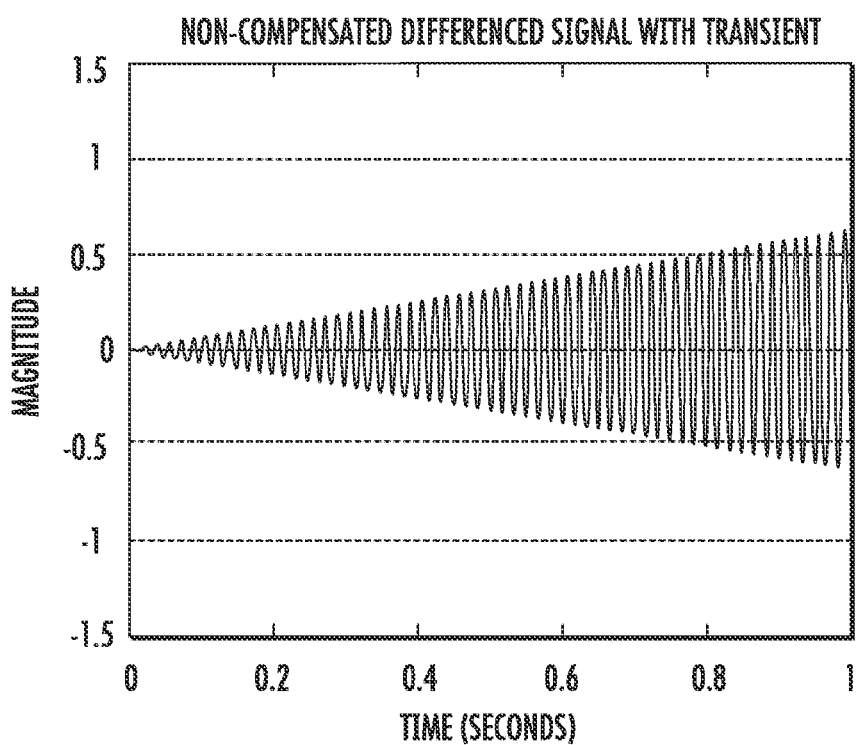
FIG. 15 shows a simulated non-compensated differenced signal with transient based on the signals shown in FIGS. 4 and 10.

Similar to Example 2, FIG. 10, a sinusoidal signal with a frequency of 59.9 Hz and unit magnitude, sampled at a rate of 15360 samples/second, for one second but with a small transient introduced at time=0.5 seconds was used as the signal of interest. This will be used to demonstrate the effectiveness of the phase drift tolerant comparison method to detect transients and other changes in the presence of phase drifts. FIG. 14 shows the result of phase drift compensated comparison operation. The transient at time=0.5 seconds can be clearly seen here. FIG. 15 shows the result of the comparison operation without employing phase drift compensation. In this case the transient is masked by and difficult to discern from the spurious change introduced due to inadvertent phase drifts in the sampled signal.

EXAMPLE 4

Figure 16:
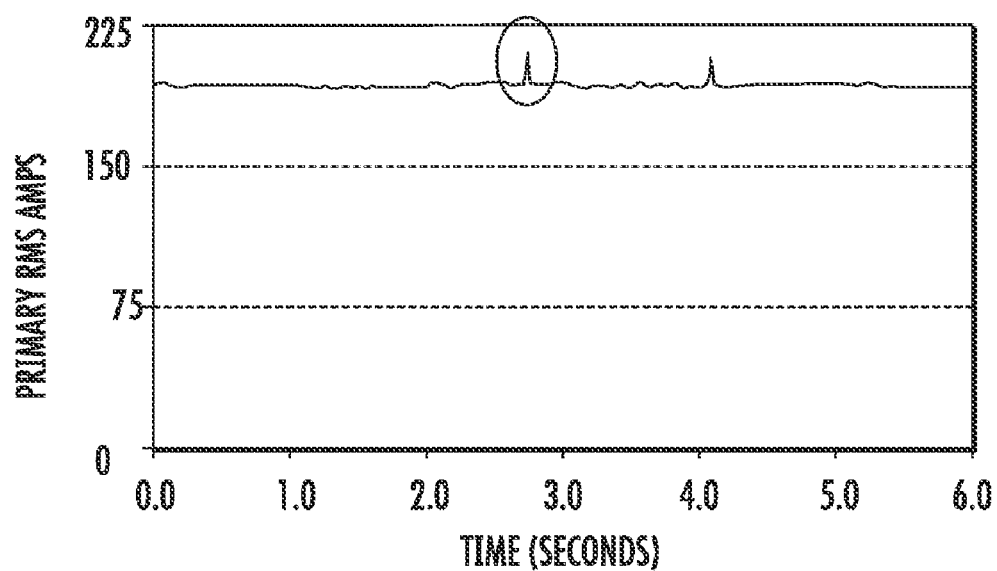
FIG. 16 is a chart showing a RMS phase current over a period of six seconds with transients.
Figure 17:
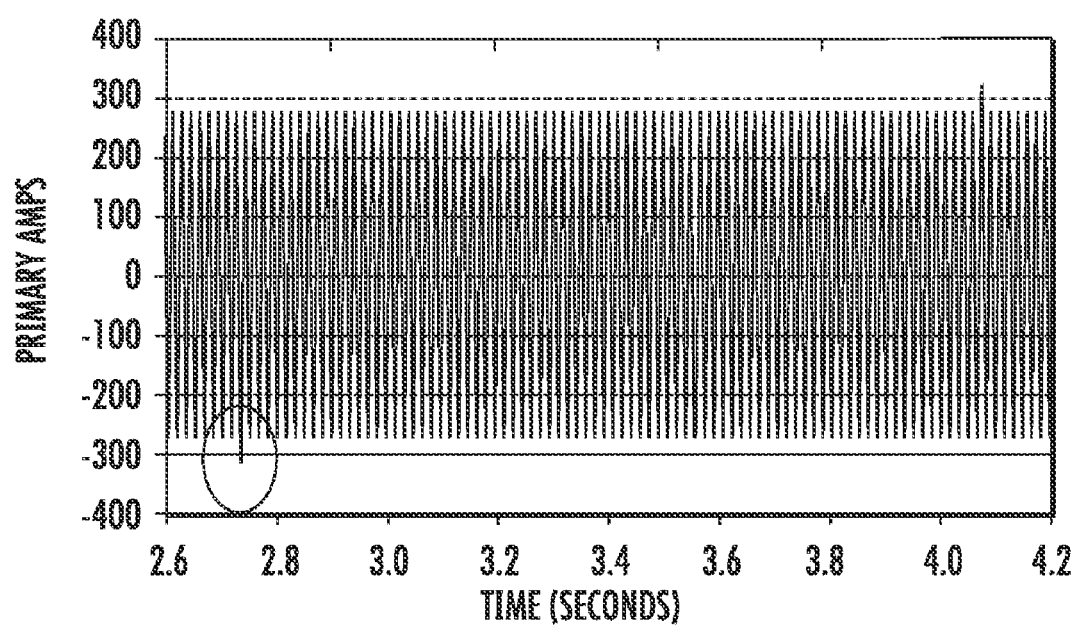
FIG. 17 is a chart showing a 1.6 second window showing the transients of FIG. 16.
Figure 18:
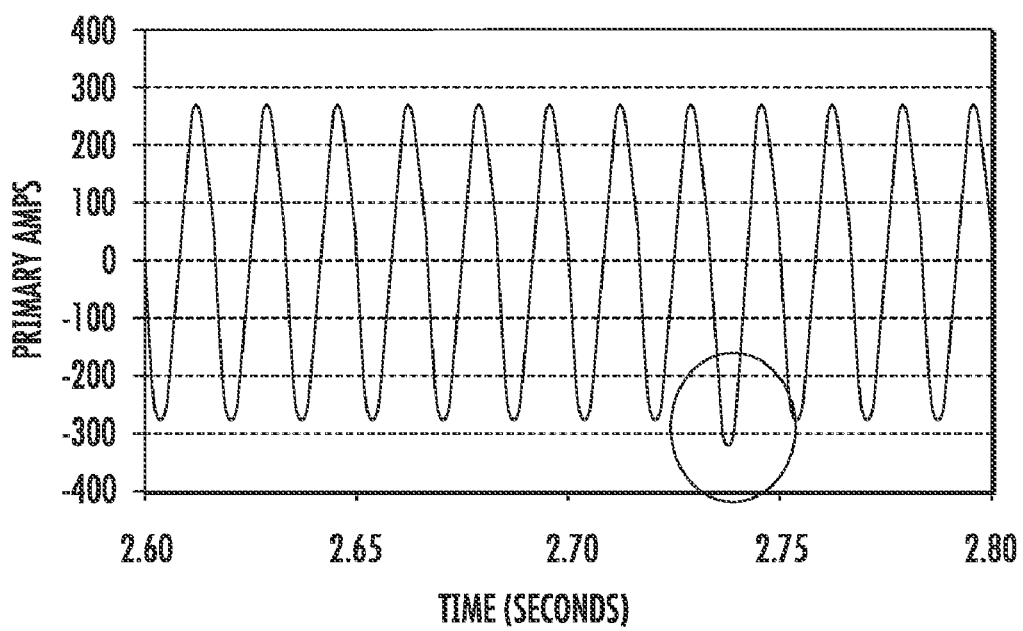
FIG. 18 is a chart showing a transient of FIG. 17.

This example demonstrates the effectiveness of the phase drift compensated method using real power system signals. FIG. 16 shows a RMS (Root Mean Square) phase current over a period of six seconds. The small transient of current, one of which is circled in FIG. 16, represent momentary increases due to an intermittent fault condition caused by vegetation that pushed two conductors together. FIG. 17 shows the current waveform corresponding to a 4.2-second portion of the same event. The same two transients can be seen, but it is apparent that they are minor in comparison to the steady-state load component. FIG. 18 highlights one of the transients, better illustrating the shape of the waveforms.

Figure 19:
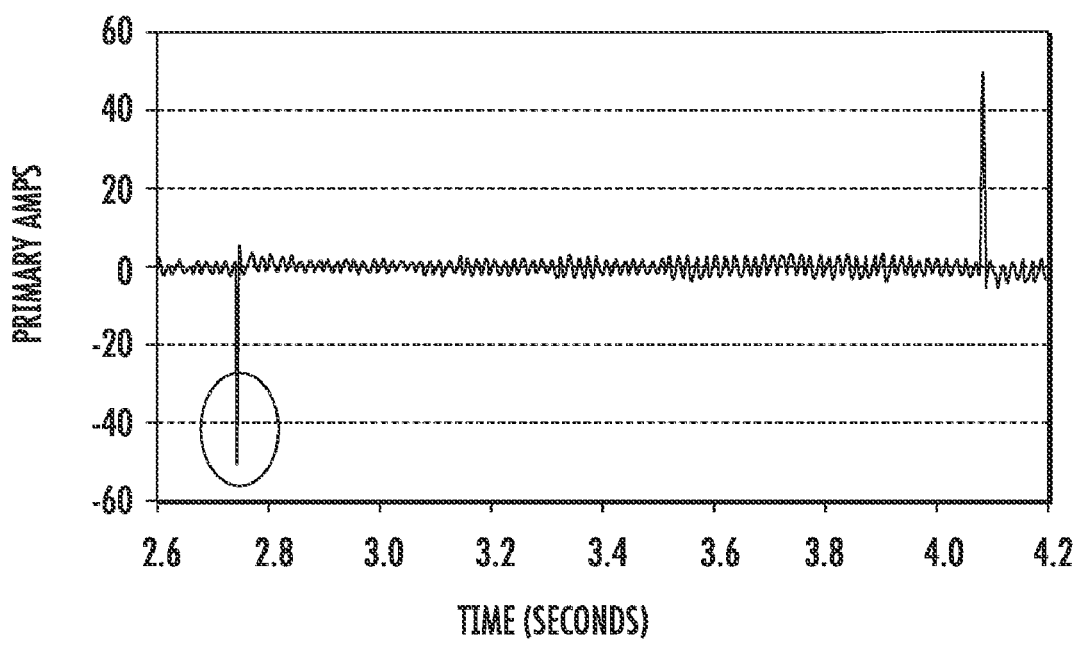
FIG. 19 is a chart showing a phase drift compensated differenced signal derived from the signal shown in FIG. 16.
Figure 20:
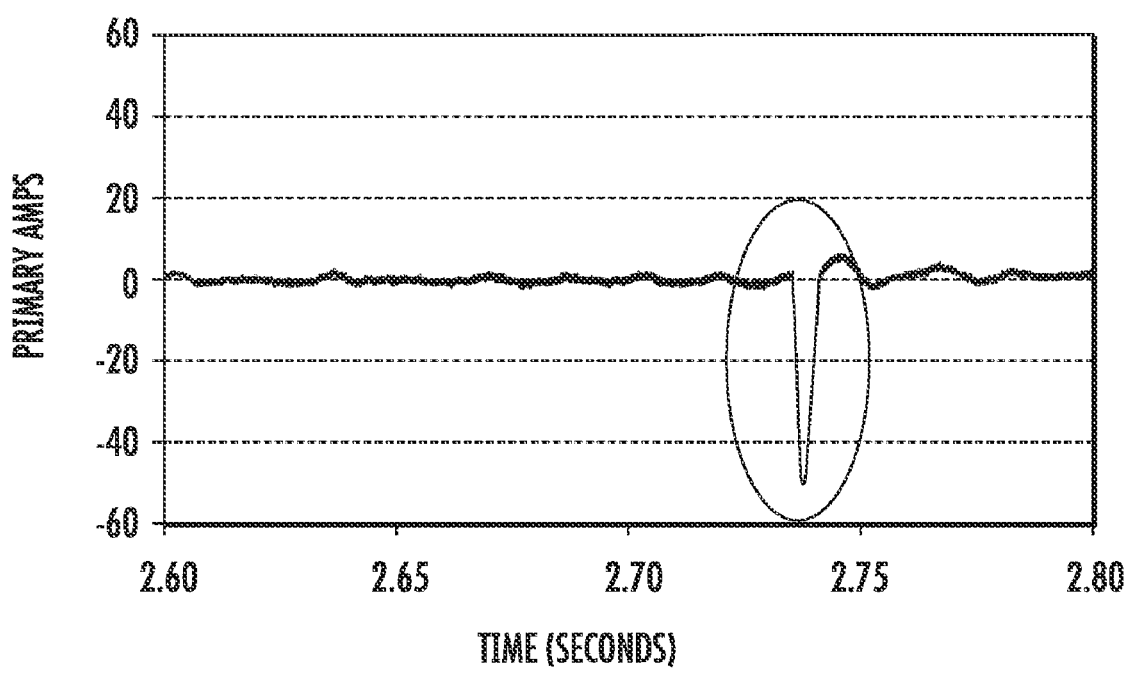
FIG. 20 is a chart showing a phase drift compensated differenced signal derived from the signal shown in FIG. 18.

FIGS. 19 and 20 show the resulting current waveforms after applying the phase drift tolerant comparison method outlined earlier. The two transients seen in FIG. 17 appear even more distinctly in FIG. 19, since the steady state load component has been removed. FIG. 20 highlights on one of the transients, better illustrating the shape of the waveform after the phase drift tolerant comparison operation.

The foregoing has described methods directed to the monitoring the operation of an electric power system. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method for processing a signal of interest in an electrical power system, wherein the signal of interest is subject to phase drift, the method comprising:
   (a) obtaining a representative window of data points from the signal of interest;
   (b) obtaining a window of interest containing data points from the signal of interest;
   (c) determining a phase drift present in the window of interest relative to the representative window, wherein the phase drift is determined by comparing at least one phase angle associated with the window of interest to at least one phase angle associated with the representative window, wherein the phase drift for a frequency f Δθ(f) can be represented in the form: $-\Delta\theta(f)=2\pi s_f+\epsilon_f$ F/f, where:
   $s_f$ represents the number of samples by which the signal of interest needs to be shifted to compensate for the phase drift;
   $\epsilon_f$ is an additional fractional compensation for the phase drift that is to be achieved for the frequency f;
   with a constraint $|\epsilon_f|<\phi_f$,
   where
   $\phi_f=2\pi f/F$;
   $\phi_f$ is the expected phase difference observed in the frequency f between two successive samples obtained from the window of interest; and
   F is a sampling rate of the samples, and compensating for the phase drift to calculate a phase drift compensated window; and
   (d) comparing the phase drift compensated window to the representative window.

2. A method according to claim 1, wherein the compensated window is determined by the steps of:
(a) computing the phase and magnitude of frequency components of the window of interest;
(b) correcting for the phase drift of the frequency components in the frequency domain to generate corrected frequency components; and
(c) computing the phase drift compensated window from the corrected frequency components.

3. A method according to claim 2 in which the phase and magnitude of frequency components are computed from the window of interest using a Discrete Fourier transform.

4. A method according to claim 2 in which the phase drift compensated window is computed by using an Inverse Discrete Fourier transform on the corrected frequency components.

5. A method according to claim 1, wherein the compensated window is determined by:
(a) determining a numbers which represents an amount that the window of interest is shifted relative to the representative window in the time domain;
(b) shifting the window of interest by an integer component of s; and
(c) shifting the window by an amount generally equal to a fractional component of s.

6. A method according to claim 5 wherein step (c) is carried out by
(a) providing a digital filter configured to modify the magnitude of each data point in the integer shifted window in a manner that is generally equivalent to shifting a data point a fraction of a sampling interval; and
(b) applying the selected digital filter to the window of interest.

7. A method according to claim 1, wherein the step of comparing a phase drift compensated window to the representative window, includes the step of computing a comparison window $\Delta w(n)$.

8. A method according to claim 7, wherein the computation of a comparison window is performed according to the equation: $\Delta w(n) = \hat{w}(n) \oplus w(n)$ where $\oplus$ is an operation done using the phase drift compensated window $\hat{w}(n)$ and the representative window $w(n)$.

9. A method according to claim 1, wherein the step of processing a signal of interest includes the step of processing a reference signal obtained synchronously with the signal of interest, wherein the signal of interest is indicative of a first property of the power system and the reference signal is indicative of a second property of the power system.

10. A method according to claim 9, wherein the reference signal is indicative of voltage and the signal of interest is indicative of current or voltage.

11. A method according to claim 9, further including the step of determining the phase drift of the window of interest relative to the representative window by:
(a) obtaining a reference window indicative of the reference signal, wherein the reference window is obtained synchronously with the window of interest;
(b) obtaining a reference representative window indicative of the reference signal, wherein the reference representative window is obtained synchronously with the representative window;
(c) estimating a first phase associated with the reference window;
(d) estimating a second phase associated with the reference representative window; and
(e) determining a reference phase drift for the reference window relative to the reference representative window by calculating the difference between the first and the second phase, wherein the reference phase drift is generally equal to the phase drift.

12. A method according to claim 9, wherein the reference signal is chosen such that it is less noisy than the signal of interest.

13. A method according to claim 9, where the representative window is chosen such that the data within is less noisy than the window of interest.

14. A computer program product comprising non-transitory computer-readable media containing instructions causing a computing device to carry out a method for compensating a signal of interest subject to phase drift, wherein the signal of interest is indicative of the operation of an electrical power system, the method comprising:
(a) obtaining a representative window of data points from the signal of interest;
(b) obtaining a window of interest containing data points from the signal of interest;
(c) determining a phase drift present in the window of interest relative to the representative window wherein the phase drift is determined by comparing at least one phase angle associated with the window of interest to at least one phase angle associated with the representative window, wherein the phase drift for a frequency f $\Delta\theta(f)$ can be represented in the form: $-\Delta\theta(f) = 2\pi s_f + \epsilon_f F/f$, where:
$s_f$ represents the number of samples by which the signal of interest needs to be shifted to compensate for the phase drift;
$\epsilon_f$ is an additional fractional compensation for the phase drift that is to be achieved for the frequency f;
with a constraint $|\epsilon_f| < \phi_f$,
where
$\phi_f = 2\pi f/F$;
$\phi_f$ is the expected phase difference observed in the frequency f between two successive samples obtained from the window of interest; and
F is a sampling rate of the samples, and compensating for the phase drift to calculate a phase drift compensated window; and
(d) comparing the phase drift compensated window to the representative window.

15. A computer program product according to claim 14, wherein the compensated window is determined by the steps of:
(a) computing the phase and magnitude of frequency components of the window of interest;
(b) correcting for the phase drift of the frequency components in the frequency domain to generate corrected frequency components; and
(c) computing the phase drift compensated window from the corrected frequency components.

16. A computer program product according to claim 15 in which:
(a) the phase and magnitude of frequency components are computed from the window of interest using a Discrete Fourier transform; and
(b) the phase drift compensated window is computed by using an Inverse Discrete Fourier transform on the corrected frequency components.

17. A computer program product according to claim 14, wherein the computing device determines the compensated window by:
(a) determining a numbers which represents an amount that the window of interest is shifted relative to the representative window in the time domain;

(b) shifting the window of interest by an integer component of s; and (c) shifting the window by an amount generally equal to a fractional component of s.

18. A computer program product according to claim 17 further including a digital filter configured to modify the magnitude of each data point in the integer shifted window in a manner that is generally equivalent to shifting a data point a fraction of a sampling interval.

19. A computer program product according to claim 14, wherein the computing device is programmed to process a reference signal obtained synchronously with the signal of interest, wherein the signal of interest is indicative of a first property of the power system and the reference signal is indicative of a second property of the power system.

20. A computer program product according to claim 19, wherein the computing device is programmed to determine the phase drift of the window of interest relative to the representative window by:

(a) obtaining a reference window indicative of the reference signal, wherein the reference window is obtained synchronously with the window of interest;

(b) obtaining a reference representative window indicative of the reference signal, wherein the reference representative window is obtained synchronously with the representative window;

(c) estimating a first phase associated with the reference window;

(d) estimating a second phase associated with the reference representative window; and (e) determining a reference phase drift for the reference window relative to the reference representative window by calculating the difference between the first and the second phase, wherein the reference phase drift is generally equal to the phase drift.

21. A computer program product according to claim 14, wherein the step of comparing a phase drift compensated window to the representative window, includes the step of computing a comparison window $\Delta w(n)$.

22. A computer program product according to claim 21, wherein the computation of a comparison window is performed according to the equation: $\Delta w(n) = \hat{w}(n) \oplus w(n)$ where $\oplus$ is an operation done using the phase drift compensated window $\hat{w}(n)$ and the representative window $w(n)$.

* * * * *